March 25, 1969    R. J. DITLINGER    3,434,373
HELICOPTER TIE-BAR
Filed Aug. 3, 1967    Sheet _1_ of 3
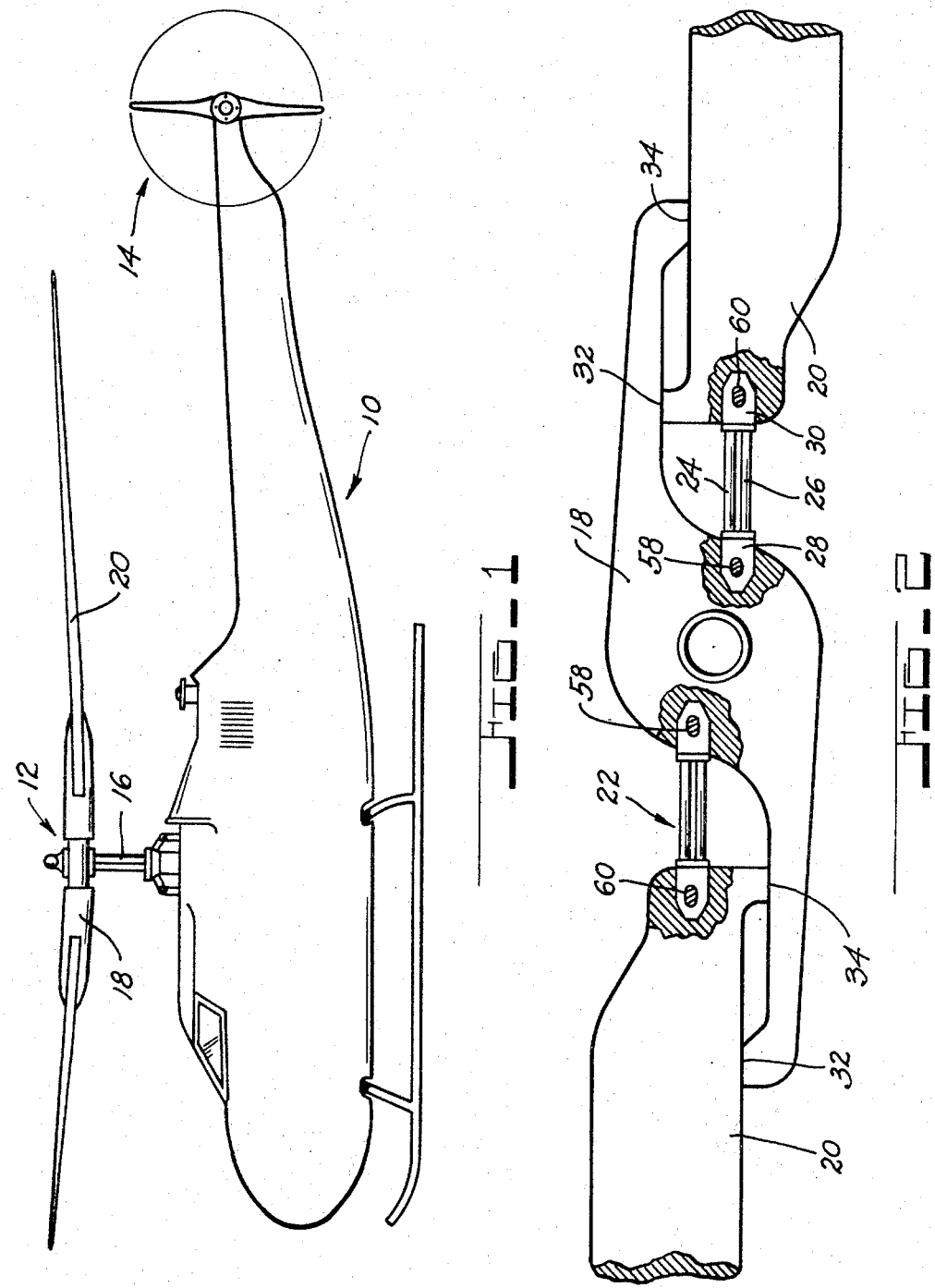
INVENTOR.
RICHARD J. DITLINGER.
BY
*Richard G. Geib*
ATTORNEY.

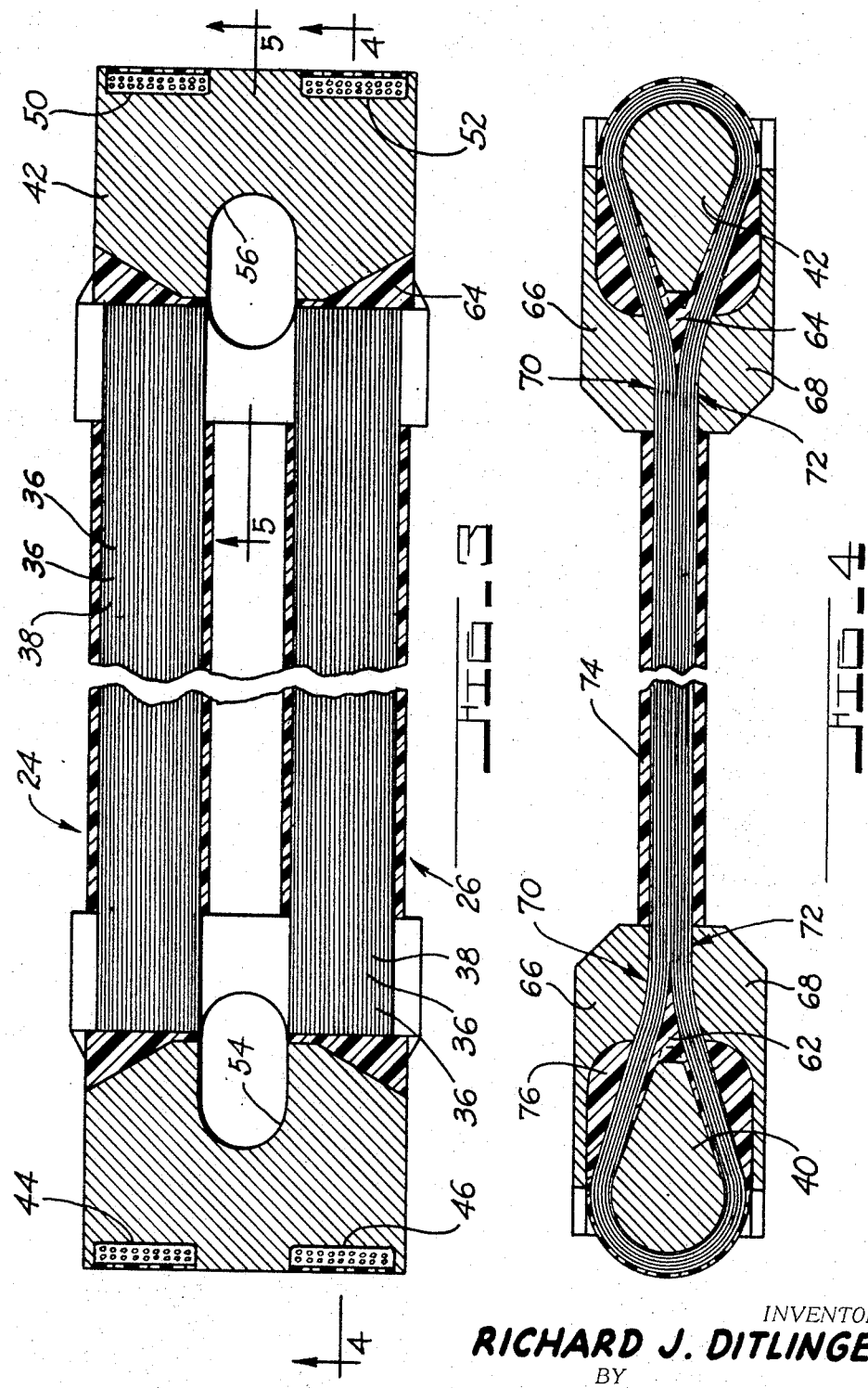

March 25, 1969  R. J. DITLINGER  3,434,373
HELICOPTER TIE-BAR
Filed Aug. 3, 1967  Sheet 3 of 3
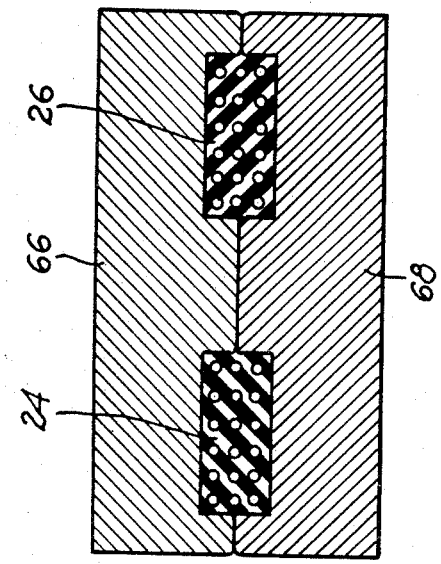
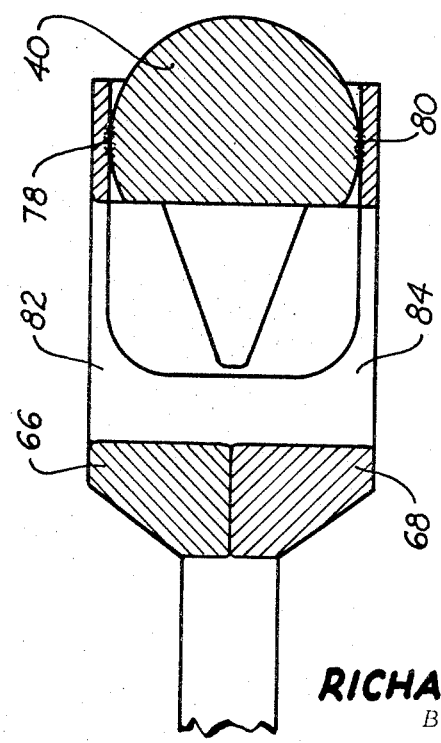
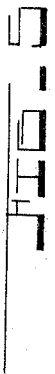
INVENTOR.
RICHARD J. DITLINGER.
BY
ATTORNEY.

United States Patent Office 3,434,373
Patented Mar. 25, 1969

3,434,373
HELICOPTER TIE-BAR
Richard J. Ditlinger, South Bend, Ind., assignor to The Bendix Corporation, a corporation of Delaware
Filed Aug. 3, 1967, Ser. No. 658,094
Int. Cl. G05g 1/00
U.S. Cl. 74—581    16 Claims

ABSTRACT OF THE DISCLOSURE

A tie-bar coupling for use, for example, in a helicopter rotor system for connecting the rotor blades and rotor arm assemblies consisting of endless loops of laminated adhesively integrated, parallel arranged filaments about novel end fittings, one of which may be connected to the helicopter rotor arm assembly and the other of which may be connected to the helicopter rotor blade, which loops are arranged on the end fittings so as to permit flapping of the rotor blades without creating deleterious bending moments in the tie-bar coupling.

SUMMARY

While this invention may well be utilized in coupling two members which must have tension and torsional restraint plus the accommodation of bending moments created by vertical displacement of one member with respect to another or horizontal displacement depending upon the attitude of the coupling, it has particular significance to the helicopter field wherein a fixed rotor system is employed.

By way of a definition a fixed rotor system is differentiated from a fully articulated rotor system which will mount a rotor blade to a rotor arm assembly so as to be pivotable about a horizontal axis, a vertical axis and capable of rotating about the longitudinal axis for adjusting the angle of attack of the rotor blade. In other words, a fully articulated rotor blade is capable of movement in three directions about its attachment to the helicopter rotor assembly. The blade can move up and down (flap) because of a horizontal hinge pin; it can move from side to side (lead and lag) because of a vertical hinge pin; and it can rotate torsionally to increase or decrease angle of attack (pitch) bacause of a nature of its attachment to a pitch arm of the rotor head.

In a fixed-rotor system for helicopters there is permissible movement in one axis, namely, that of rotating about the longitudinal axis of the blade to adjust the pitch or angle of attack of the rotor blades. The lead-lag and flapping motions imparted by external air dynamic forces prevailing in the rotor plane of the rotation are still present in the fixed rotor system in a limited degree. Therefore, any coupling between the rotor arm assembly and the rotor blade will have to accommodate these movements and the forces that cause them.

In the fully articulated rotor head for the helicopter, couplings of the nature of the present invention have been utilized wherein their axis is along the longitudinal axis of the blade and ahead of the horizontal and vertical hinge points for the rotor system so that the coupling is loaded purely in tension and torsion without experiencing any effect from the lead-lag and flapping motions of the rotor blade. Consequently, tie-bar couplings designed for use in the fully articulated rotor head find disadvantages when being placed into the fixed-rotor system for helicopters. Accordingly, it is a principal object of this invention to provide a tie-bar coupling which can be utilized in either of the types of rotor system aforementioned and which in the fixed-rotor system finds particular application because of its accommodation for bending moments.

DRAWING DESCRIPTION

FIGURE 1 is a schematic illustration of a helicopter within which a tie-bar in accordance with this invention is installed in the rotor system thereof on the pitch change axis of the rotor blade;

FIGURE 2 is a schematic illustration of a typical rotor system employing the tie-bar coupling in accordance with the principles of this invention;

FIGURE 3 is a cross sectional plan view of a tie-bar coupling in accordance with the principles of this invention and may be utilized in the coupling of the helicopter blade to the rotor arm assembly as seen in FIGURE 2;

FIGURE 4 is a cross sectional side view of the tie-bar type coupling taken along lines 4—4 of FIGURE 3;

FIGURE 5 is a cross sectional side view of the end fitting for the tie-bar coupling taken along lines 5—5 of FIGURE 3; and FIGURE 6 is a cross sectionalized end view of the end fitting for the tie-bar coupling.

DETAILED DESCRIPTION

With more particular reference now to the figures there is shown in FIGURE 1 a helicopter 10 having a single lifting rotor system 12 and a stabilizing tail rotor 14. This helicopter may be more particularly described as including a power plant within the aft section of the fuselage for driving a rotor shaft 16 to which a rotor arm assembly 18 is affixed and which carries a plurality of rotor blades 20.

As will be appreciated by those skilled in the art of helicopters this rotor system 12 is provided with appropriate controls for adjusting cyclic and collective pitch of the rotor blades 20 so as to provide for control flight of the helicopter 10.

The rotor system about the shaft 16 is schematically shown in FIGURE 2 to include a pair of helicopter tiebars 22 connecting the blade 20 with the rotor arm assembly 18. The tie-bar 22 is shown in outline form to show spaced loops 24 and 26 about end fittings 28 and 30 which will be more particularly described later. In addition to the tie-bar couplings 22 the rotor blades 20 are hinged as at 32 and 34 by pins (not shown) to the rotor arm assembly 18. Generally speaking, the preferred location of the spaced loops 24 and 26 is to be equidistant from the pitch change axis of the rotor blades 20.

As can be seen from FIGURE 3 the loops 24 and 26 comprise a plurality of parallel aligned filaments 36 integrated by an adhesive 38 which, depending upon the rotor system may have varying degrees of stiffness and may in fact be comprised of a polyurethane composition as described in applicant's copending application Ser. No. 150,455, filed Nov. 6, 1961. The loops 24 and 26 are wrapped about cross or transverse pins 40 and 42 within spaced recesses 44, 46 and 50, 52 of the respective transverse pins 40 and 42. These transverse pins 40 and 42 are provided with slots 54 and 56 to receive pins 58 and 60 (see FIGURE 2) joining the tie-bar to either the rotor assembly 18 or the blade 20, respectively.

As seen in FIGURE 4, the pins 40 and 42 have a teardrop shaped cross-section, i.e., tapering toward the center of the tie-bar coupling, and after the wrapping of the loops 24 and 26 about the pins 40 and 42 within the respective recesses 44, 46 and 50, 52 a flexible plastic or rubber composition 62 and 64 is injected between the pins 40 and 42 and the side portions on each of the loops 24 and 26 thereafter clamping blocks or plates 66 and 68 having converging surfaces of revolutions 70 and 72 are placed over the assembly of the loops about the pins 40 and 42 to draw the side portions of the loops together as they emerge from the end fittings to form a bar appearing member between the end fittings which is thereafter coated by means of a flexible plastic or rubber composition 74. Thereafter a similar flexible plastic or rubber composition 76 is injected into the cavity between the clamping plates and the underlying assemblage of the loops and transverse pins and hardened thereover to bond to the loops and the clamping plates. If it is desired, bolts may be placed through the clamping plates along the center of the coupling between the spaced loops 24 and 26 to further insure the mating of the end fitting pieces. Other means of insuring placement of the clamping blocks 66 and 68 would be by a circular wire wrap or by bearing against the mating hub part.

In this construction the span or width of each of the loops is of a substantially greater dimension than the depth, as may be seen upon comparing FIGURES 3 and 4.

As may be observed from FIGURE 5, the clamping plates 66 and 68 may be spot welded as at 78 and 80 to the central portion of the transverse pins 40 and 42. The clamping blocks or plates 66 and 68 are provided, each, with mating slots 82 and 84 that are above and below the slots 54 and 56 of the transverse pins 40 and 42 so that the pins 58 and 60 may extend through the end fittings intermediate the spaced loops 24 and 26.

As may be seen from observing FIGURE 6 the clamping plates 66 and 68 maintain the spacing of the loops 24 and 26 as they emerge from one end fitting toward the other.

Having described a manner of making a tie-bar coupling in accordance with the principles of my invention, it is now desired to set forth the intended scope of protection sought by Letters Patent as follows.

I claim:

1. A coupling of laminations of integrated filaments comprising:
   first and second endless loops of said integrated filaments;
   a pair of cross pins having first and second ends mated with said first and second loops; and
   a pair of upper and lower plates mated with said pair of cross pins and said first and second loops such that said loops have non-overlapping side portions over the portion of their length between said pins which permit vertical displacement of the first pin with respect to the second pin with resiliency as to rotational movement between said first pin and said second pin and tensile restraint therebetween.

2. A coupling according to claim 1 and further comprising elastomeric means about the ends of said first and second loops within the area between said upper and lower plates.

3. A coupling according to claim 1 wherein said first and second ends of said cross pins are of tear-drop shape cross-section with the narrowest portions facing each other so that said upper and lower plates may arrange the side portions in an abutting relationship along their intermediate areas.

4. A coupling according to claim 3 wherein said upper and lower plates are each provided with facing surfaces of revolution at the sides thereof adjacent the narrowest portion of said tear-drop shaped first and second ends of said cross pins to permit the positioning of said side portions of said first and second loop into said abutting relationship.

5. A coupling according to claim 4 wherein an elastomeric means fills the spaces between said upper and lower plates and said first and second loops as well as a cavity between the tear-drop shape of said first and second ends and said first and second loops.

6. For use with a coupling of adhesively integrated filaments laminated into an endless loop an end fitting comprising:
   a cross pin fitted within said loop;
   a first plate joined to said cross pin, said first plate having a stepped inner surface;
   a second plate joined to said cross-pin opposite said first plate, said second plate having a stepped inner surface facing the stepped inner surface of said first plate to define a large cavity for receipt of said cross pin therein and a smaller opening for passage of said endless loop therefrom; and
   elastomeric means filling said cavities as exist around said loop and centrally about said cross pin between sides of said loop.

7. The structure of claim 6 and further characterized by having a portion of the stepped inner surfaces of said first plate and said second plate defining said smaller opening shaped as surfaces of revolution shaping said loop as it emerges from said end fitting.

8. The structure of claim 6 wherein said cross pin within said loop is provided with a lubricant coating to permit slippage of said loop thereabout.

9. The structure of claim 7 wherein said cross pin is shaped cross-sectionally as a tear-drop and said loop emerges from said end fitting with a rectangular cross-sectional configuration whose width is twice the width of a side portion of the loop.

10. The structure of claim 9 wherein said tear-drop shaped cross pin is coated on its surface engaging said loop with a means to permit relative movement of said loop as respects said cross pin.

11. A coupling of laminations of adhesively integrated and spaced filaments comprising:
   spaced loops of said arrangement of filaments whose major thickness is parallel to the horizontal plane of said loop;
   cross pins having shaped end portions within said loops at each semicircular end thereof; and
   clamping blocks joining said loops and cross pins including upper and lower plates machined at each side and along their rear face to receive said spaced loops and said cross pins, said upper and lower plates being joined together by means preventing relative movement therebetween and said upper and lower plates having facing surfaces of revolution prescribing and opening for portions of said loop connecting said semicircular ends.

12. The structure of claim 11 wherein said clamping blocks cooperate with a tear-drop shape of said end portions of said cross pins to abut said side portions to form spaced elements between said end fittings whose width exceeds their depth.

13. The structure of claim 11 wherein said elements are equidistant from the longitudinal axis of said coupling.

14. In a helicopter rotor system having a rotor arm and a rotor blade, a tension-torsion tie-bar type coupling which permits flapping of said blade with respect to said arm, said coupling comprising:
   a first loop of adhesively integrated filaments having semicircular ends connected by parallel side portions whose major dimension is in the same direction as the span of said blade;
   a second loop of adhesively integrated filaments having semicircular ends connected by parallel side portions whose major dimension is in the same direction as the span of said blade;
   a first cross pin having an intermediate body and shaped ends, which ends are located within a semicircular end of said first loop and a semicircular end of said second loop to space said first loop and said second loop;
   a second cross pin having an intermediate body and shaped ends, which ends are located within another semicircular end of said first loop and another semicircular end of said second loop;
   a clamping block means for each of said first cross pin and loops and said second cross pin and loops engaging the intermediate bodies thereof, said clamping block having surfaces of revolution shaping said first loop and said second loop as they emerge therefrom;

elastomeric means filling all cavities within said clamping block; and pin means joining said clamping block means to said rotor arm and to said rotor blade.

15. The structure of claim 14 wherein said clamping block means force the parallel side portions of said first loop and said second loop to abut in a structure which is encapsulated between said clamping block means.

16. The structure of claim 14 wherein said pin means is characterized by rectangularly shaped pins received by similarly shaped slots in said first and second cross pins and said clamping block means to enable closer spacing of said first and second loops to reduce stresses due to twisting.

References Cited

UNITED STATES PATENTS 3,279,278   10/1966   Eldred _____ 74—579
3,370,483   2/1968   Ditlinger _____ 74—579

FRED C. MATTERN, JR., *Primary Examiner.*

F. D. SHOEMAKER, *Assistant Examiner.*